UNITED STATES PATENT OFFICE.

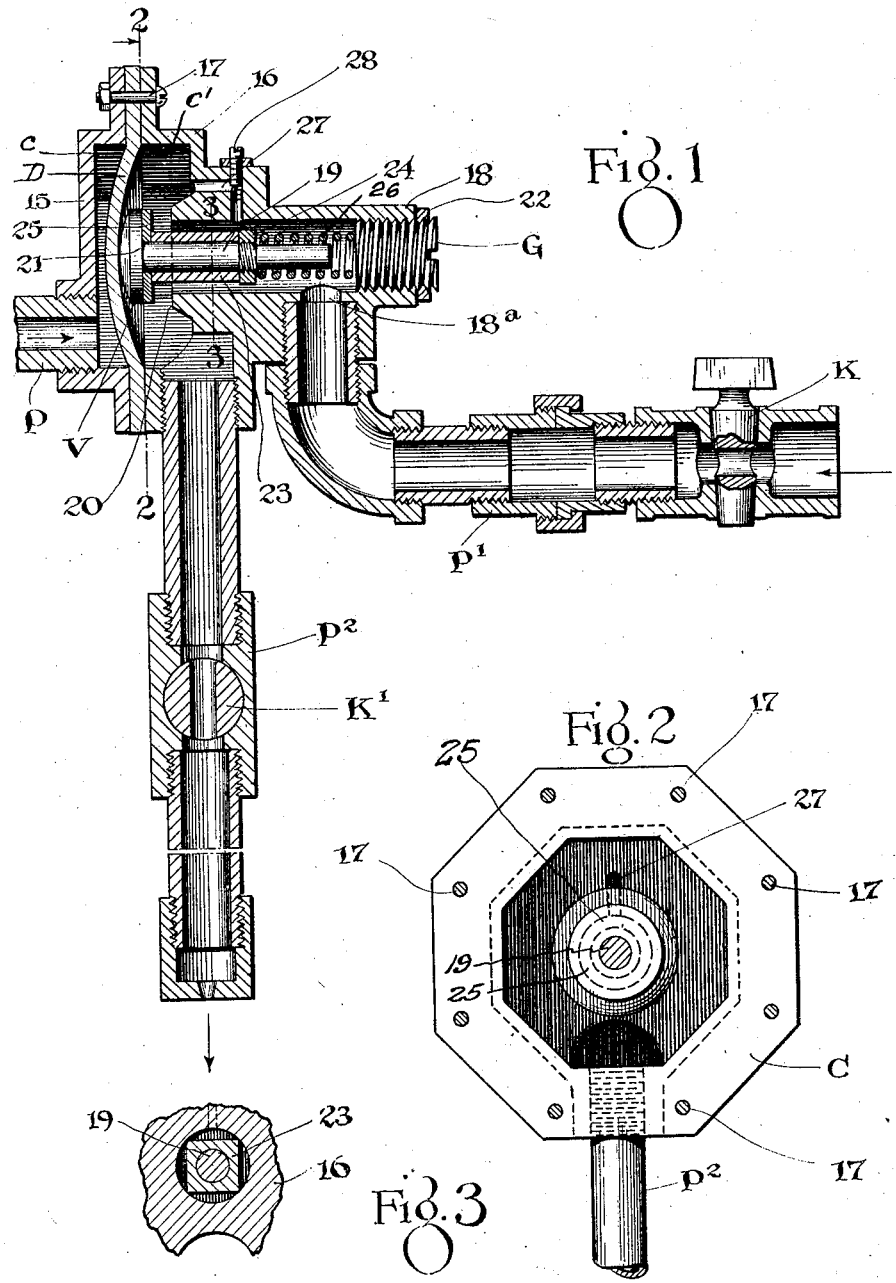

LEO EUGENE TROSCLAIR, OF NEW ORLEANS, LOUISIANA.

GAS-REGULATING VALVE.

1,407,963. Specification of Letters Patent. Patented Feb. 28, 1922.

Application filed May 21, 1920. Serial No. 383,167.

*To all whom it may concern:*

Be it known that I, LEO EUGENE TROSCLAIR, a citizen of the United States, and a resident of New Orleans, in the parish of Orleans and State of Louisiana, have invented certain new and useful Improvements in Gas-Regulating Valves, of which the following is a specification.

My invention relates generally to valves which are automatically operable by the pressure of one fluid to control the flow of another fluid. More particularly, my invention relates to a valve which is operable by the pressure of steam within a boiler to control and regulate the supply of gas to burners used in heating the boiler.

A purpose of my invention is the provision of a valve of the above described character which is of simple and efficient construction and which is adjustable to vary the steam pressure with which such valve is adapted to be closed.

I will describe one form of valve embodying my invention and will then point out the novel features thereof in the claim.

In the accompanying drawings:

Figure 1 is a view showing in vertical section one form of valve embodying my invention.

Figure 2 is a vertical sectional view taken on the line 2—2 of Figure 1.

Figure 3 is a transverse sectional view of the supporting sleeve for the valve stem shown in Figure 1.

Similar reference characters refer to similar parts in each of the views.

Referring specifically to the drawings and particularly to Figures 1 and 2, C designates generally a casing of octagonal formation comprising a pair of sections 15 and 16 formed with flanges at their confronting edges secured together by means of bolts 17 in the manner shown in Figure 2. Interposed between the sections 15 and 16 is a diaphragm D which is preferably formed of a composition of rubber and cotton, such diaphragm dividing the casing into a steam compartment $c$ and a gas compartment $c'$. As shown in Figure 1, the marginal edges of the diaphragm D are interposed between the flanges of the sections 15 and 16 and are adapted to be gripped by such flanges when the bolts are properly adjusted so as to form a fluid-tight connection between the two sections. Steam is admitted to the steam compartment $c$ through a pipe P connected to the casing adjacent the bottom thereof so as to allow of the drainage of condensed steam from the compartment and to thereby prevent deterioration of the diaphragm D. It will be understood that the pipe P is adapted to be connected to a boiler which is heated by gas.

Formed integral with the section 16 is a tubular extension 18, the bore of which communicates with the compartment $c'$ and provides a valve chamber in which works the stem 19 of a valve V. The inner end of the extension 18 is formed with a valve seat 20 and projects into the compartment $c'$ and upon which a head 21 of the valve V is adapted to seat. The opposite end of the extension 18 is screw threaded interiorly to receive a screw threaded plug G, such plug being adjustable within the extension and adapted to be locked in any adjusted position by means of a lock nut 22.

As shown in Figure 1, the head 21 of the valve V is formed on the inner end of the stem 19, while the stem 19 is supported for longitudinal movement within the extension 18 by means of a sleeve 23 which snugly embraces the same in the manner shown. As shown in Figure 3, the sleeve 23 is of rectangular formation in cross section so that the corners thereof slidably contact with the inner wall of the tubular extension so as to movably support the valve as a unit within the extension. The sleeve 23 is locked upon the stem 19 by means of a nut 24 which threadedly engages the stem in the manner shown. Interposed between the sleeve 23 and the valve head 21 is a leather washer 25 which in the closed position of the valve is adapted to contact with the valve seat 20 so as to form a fluid-tight seal, as will be understood. The washer 25 embraces the stem 19 and can be securely held in snug engagement with the head 21 by adjusting the nut 24 so as to force the stem 23 into engagement with the washer. This arrangement also permits of the ready removal of the washer when it becomes worn and useless.

Surrounding the portion of the valve stem 19 is a coiled expansible spring 26, one end of which bears against the nut 24, while its opposite end engages the inner end of the plug G so that by adjusting the plug inwardly or outwardly, with respect to the extension 18, the tension of the spring 26 can be varied to increase or decrease the pressure necessary to close the valve V. As shown in Figure 1, the head 21 of the valve V normally bears against the diaphragm D and under the expansive action of the spring 26 flexes the diaphragm to the left as shown.

Gas is supplied to the compartment $c'$ through the extension 18, the latter being provided with a port $18^a$ which communicates with a gas supply pipe P'. The gas supply pipe P', as shown in Figure 1, is made up of several pipe sections of conventional form which are connected in a manner to permit of a longitudinal adjustment of the pipe as a unit and to rotatably support the casing C and the extension 18 thereupon. The pipe P' is adapted to be connected to any suitable source of gas (not shown) and the passage of gas through the pipe is controlled by a cock K. Gas from the compartment $c'$ is conveyed to the burners for the boiler previously mentioned through a pipe $P^2$ comprised of several sections of conventional form, one of which sections is provided with a cock K' for controlling the passage of gas to the burner.

From the foregoing arrangement, it will be seen that the supply of gas to the pipe $P^2$ is directly controlled by the valve V. When the valve is in open position as shown in Figure 1, the passage of gas from the pipe P' to $P^2$ is unrestricted. However, when the valve V is in closed position, that is when the head 21 firmly engages the seat 20, the flow of gas past the valve is prevented. In order to allow of the flow of a small quantity of gas through the gas compartment $c'$ and into the pipe $P^2$ so as to maintain the gas burners lighted at all times, I provide the section 16 of the casing C with an L-shaped by-pass 27 which communicates at one end with the interior of the extension 18, and at its opposite end with the compartment $c'$. The passage of gas through this by-pass is controlled by the plug 28 which is threadedly mounted with the casing section so as to be capable of adjustment for varying the amount of gas passing through such by-pass.

In operation, the valve V normally occupies an open position as shown in Figure 1 so that the full amount of gas is supplied to the burners to effect a heating of the water within the boiler. As soon as the water within the boiler is heated to a boiling point, the steam therefrom enters the steam compartment $c$ through the pipe P, and as the pressure of the steam increases it acts upon the diaphragm D to force the same in the direction of the valve tending to move the latter to closed position. As the valve V and the diaphragm D move against the tension of the spring 26, it will be clear that by varying the tension of the spring through an adjustment of the plug G, the steam pressure at which the valve is moved to closed position can be readily regulated and varied. With the valve in closed position it will be clear that the amount of gas supplied to the burners is materially reduced thus lowering the flame and consequently reducing the heat supplied to the boiler. As will be understood, a small flow of gas is supplied to the burner through the by-pass 27 so with the valve V in closed position the burners will at all times be lighted. The intensity of the flame can be regulated by an adjustment of the plug 28.

When the water within the boiler is sufficiently cool as to reduce the pressure of steam within the compartment $c$, the diaphragm D returns to its normal position under the action of the spring 26 so that the valve again moves to open position thus again allowing the full supply of gas to the burners.

The cocks K and K' provide means independent of the valve V for controlling the supply of gas to and from the valve, and in a manner which will be readily understood.

Although I have herein shown and described only one form of regulating valve embodying my invention, it is to be understood that various changes and modifications may be made herein without departing from the spirit of the invention and the spirit and scope of the appended claim.

What I claim is:

A gas regulating valve comprising, a casing, a diaphragm within the casing and arranged to divide the casing into steam and gas compartments, a steam supply pipe communicating with the steam compartment in a manner to effect a drainage of condensed steam from the compartments, an extension formed on said casing and communicating with said gas compartments, a valve seat formed on one end of the extension, a plug threadedly engaging the opposite end of the extension, a gas supply pipe communicating with said extension, a second pipe communicating with said gas chamber adapted to convey gas to a burner, and a valve comprising a stem, a sleeve embracing the stem and slidably mounted within said extension, a head formed on one end of the stem and adapted to engage said diaphragm, a washer interposed between said sleeve and head, a nut on said stem and engaging said sleeve for forcing the latter into engagement with said washer, and a spring surrounding said stem and interposed between said nut and said plug.

LEO EUGENE TROSCLAIR.